(No Model.)
W. METCALF.
AUTOMATIC BICYCLE PUMP.
No. 604,625. Patented May 24, 1898.
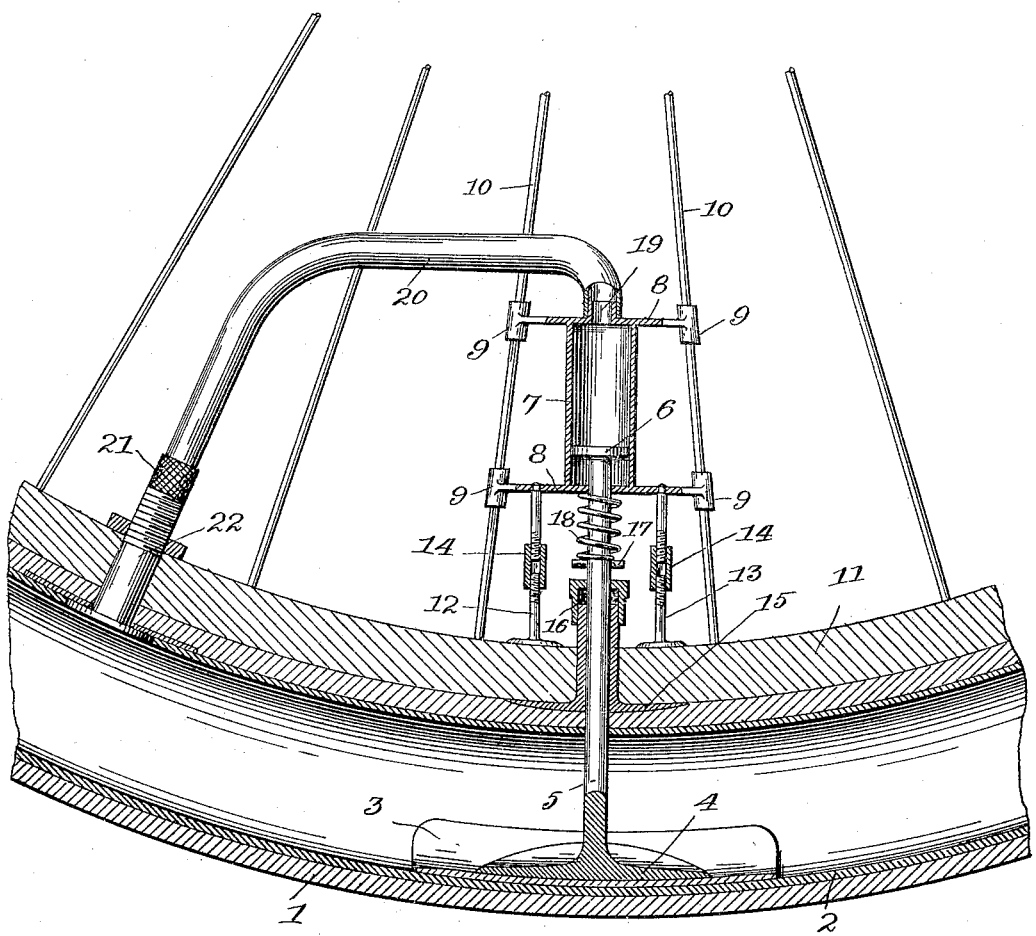
Witnesses
Harry W. Hahn
Victor J. Evans
Inventor
Warren Metcalf.
By John Wedderburn
Attorney

UNITED STATES PATENT OFFICE.

WARREN METCALF, OF SKIPPERSVILLE, ALABAMA.

AUTOMATIC BICYCLE-PUMP.

SPECIFICATION forming part of Letters Patent No. 604,625, dated May 24, 1898.

Application filed August 27, 1897. Serial No. 649,761. (No model.)

*To all whom it may concern:*

Be it known that I, WARREN METCALF, a citizen of the United States, residing at Skippersville, in the county of Dale and State of Alabama, have invented certain new and useful Improvements in Automatic Bicycle-Pumps; and I do hereby declare the following to be a full, clear, and exact description of the invention, such as will enable others skilled in the art to which it appertains to make and use the same.

This invention relates to automatic bicycle-pumps, the object in view being to provide means, in connection with an ordinary pneumatic tire, for automatically and uniformly inflating the tire while the machine is being ridden, thus preventing the deflation of the tire even though the same may become punctured.

It is also the object of the invention to provide, in connection with such automatic pump, means whereby the throw of the piston may be regulated for correspondingly regulating the rapidity of inflation.

Other objects and advantages of the invention will appear in the course of the subjoined description.

The accompanying drawing represents a sectional view taken longitudinally through a pneumatic tire, also showing a portion of the rim and spokes with the automatic inflating device applied thereto.

Referring to the drawing, 1 designates the outer case, and 2 the inner tube, of a pneumatic tire, the inner tube being lined inside with a piece of fabric or tape 3 for the purpose of carrying out this invention. Bearing upon the fabric 3 is the foot-piece or shoe 4 of the rod or stem 5 of a piston 6, which works in a pump-cylinder 7. The pump-cylinder 7 is provided at each end with cross-heads 8, and the cross-heads are provided at their opposite ends with sleeves 9, which are slidingly but tightly fitted upon adjacent spokes 10. Extending between the rim 11 and the adjacent cross-head 8 are two extensible connections 12, each comprising two threaded bolts or rods 13, having right and left hand threads respectively connected by means of a turnbuckle 14, by turning which the distance between the rim and pump-cylinder may be adjusted in a manner that will be readily understood from the drawing.

The upper cross-head of the pump-cylinder is not as long as the lower cross-head, and the two cross-heads are thus made to accommodate the pump-cylinder to the divergent positions of the spokes. As is well known in this art, the spokes of a wheel are elastic, so that they will give or spring laterally a limited distance, and in adjusting the pump inwardly toward the wheel-hub this elasticity in the spokes is availed of, as they will give or spring sufficiently to insure the adjustment of the cylinder to the extent desired in my invention.

The pump-rod 5 passes through a casing 15, connected to the rim and outer side of the tire, the said casing having a suitable packing 16 to prevent leakage of air about the rod 5. Extending through the rod 5 is a cross-pin 17, and between this pin and the pump-cylinder is arranged a spiral spring 18, which is coiled around the rod 5 and which exerts its tension to normally depress the foot or shoe 4 after the same has been pushed upward for working the piston 6 and compressing air.

The pump-cylinder is provided at its upper end with a thimble or hollow boss 19 to receive a flexible tube 20, said tube connecting at its opposite end with the nozzle 21 of an inflating valve 22, which communicates with the inner tube of the tire in the usual manner.

From the foregoing description it will be seen that in the event of the tire becoming partially deflated at each revolution of the wheel the shoe 4 will be pressed upward, thus working the piston of the pump and compressing air in the cylinder and finally forcing said air through the tubular connection 20 into the inner tube until the tire is again inflated. The degree of inflation may be regulated by adjusting the turnbuckles 14, by means of which the position of the cylinder is governed and thereby the length or stroke of the piston, thus regulating the amount of air pumped into the tire at each stroke.

The device is extremely simple in construction, reliable in operation, and will be found of great value in connection with pneumatic tires, as it will serve to keep said tires properly inflated at all times.

Having thus described the invention, what is claimed as new, and desired to be secured by Letters Patent, is—

1. In an automatic inflating device for pneumatic tires, a pump-cylinder provided at its ends with cross-heads having sleeves adapted to slidingly fit upon adjacent spokes, in combination with a flexible tube adapted to be applied to the inflating-valve of the tire, a reciprocating piston in said pump-cylinder, a piston-rod extending into the tire and having a foot or shoe for contact with the outer portion of the tire, a spring for normally pressing said piston outward, and longitudinally-extensible connections between the wheel-rim and the adjacent cross-head of the pump-cylinder, all arranged for joint operation, substantially as described.

2. In an automatic tire-inflater, the combination with wheel-spokes and a tire, of a pump-cylinder fitted to adjacent wheel-spokes for slidable adjustment thereon, adjustable devices between the pump-cylinder and wheel-rim for holding the pump-cylinder in a fixed position and for securing a limited adjustment of the pump-cylinder relatively to the tire, and a piston-rod actuated by the tire on partial deflation thereof, substantially as described.

3. In an automatic tire-inflater, the combination with wheel-spokes, a wheel-rim, and a tire, of a pump-cylinder fitted to adjacent wheel-spokes for limited adjustment thereon, means for rigidly connecting the pump-cylinder with the wheel-rim, a tubular connection between the pump-cylinder of the tire, and a piston-rod fitted within the tire to be actuated by the latter on partial deflation thereof, substantially as described.

4. In an automatic tire-inflater, the combination with a wheel-rim and a tire, of a pump-cylinder slidably fitted to the wheel-spokes, the extensible rods attached to the wheel-rim and pump-cylinder for holding said pump-cylinder normally in a fixed position with relation to the rim and spokes, and a piston-rod actuated by the tire, substantially as described.

5. In an automatic tire-inflater, the combination with a wheel-rim, a tire, and wheel-spokes, of the bushing fixed in the wheel-rim, a pump-cylinder having the cross-heads fitted to the spokes, rods fixed to the wheel-rim and the cross-head of the cylinder, a piston-rod passing through the bushing and having a piston-head at one end and a shoe at the other end, a coiled spring acting against a shoulder or stud of the rod, and a tubular connection between the cylinder and the tire, substantially as described.

In testimony whereof I have signed this specification in the presence of two subscribing witnesses.

WARREN METCALF.

Witnesses:
BASCOM DOWLING,
J. M. MCDONALD.